United States Patent
Fonseca, Jr. et al.

(10) Patent No.: US 10,909,161 B2
(45) Date of Patent: Feb. 2, 2021

(54) SYSTEM TO BUILD ADVERTISEMENT DATABASE FROM UNRELIABLE SOURCES

(71) Applicant: ARRIS Enterprises LLC, Suwanee, GA (US)

(72) Inventors: Benedito J. Fonseca, Jr., Glen Ellyn, IL (US); Venugopal Vasudevan, Palatine, IL (US); Faisal Ishtiaq, Plainfield, IL (US); Anthony J. Braskich, Kildeer, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/394,276

(22) Filed: Dec. 29, 2016

(65) Prior Publication Data
US 2018/0189276 A1 Jul. 5, 2018

(51) Int. Cl.
| | |
|---|---|
| H04N 21/234 | (2011.01) |
| H04N 21/25 | (2011.01) |
| H04N 21/439 | (2011.01) |
| H04N 21/658 | (2011.01) |
| H04N 21/845 | (2011.01) |
| H04N 21/81 | (2011.01) |
| H04N 5/91 | (2006.01) |
| G06F 16/41 | (2019.01) |

(52) U.S. Cl.
CPC ....... *G06F 16/41* (2019.01); *H04N 21/23418* (2013.01); *H04N 21/251* (2013.01); *H04N 21/4394* (2013.01); *H04N 21/6581* (2013.01); *H04N 21/812* (2013.01); *H04N 21/8456* (2013.01); *H04N 5/91* (2013.01)

(58) Field of Classification Search
CPC ................................................... H04N 21/812
See application file for complete search history.

(56) References Cited

U.S. PATENT DOCUMENTS

| | | | |
|---|---|---|---|
| 7,400,364 B2 * | 7/2008 | Chen | ........................ H04N 5/50 348/465 |
| 8,238,669 B2 | 8/2012 | Covell et al. | |

(Continued)

OTHER PUBLICATIONS

Alexander, Hauptmann; Story Segmentation and Detection of Commercials In Broadcast News Video (Year: 1998).*

*Primary Examiner* — Hsiungfei Peng
(74) *Attorney, Agent, or Firm* — Buchanan Ingersoll & Rooney PC

(57) ABSTRACT

Systems and methods for determining the location of advertisements in multimedia assets are disclosed. A method includes obtaining a multimedia asset comprising at least one of video, audio and text, identifying segments of the multimedia asset, and for each segment, determining whether the respective segment represents an advertisement. For each segment that represents an advertisement, the method further includes extracting a predetermined number of fingerprints from the respective segment, submitting, to an advertisement database, the predetermined number of fingerprints, receiving, from the advertisement database, a count of the extracted fingerprints matching fingerprints previously stored in the advertisement database, and determining, based on the count, whether to add an indication that the respective segment is a new advertisement to the advertisement database.

20 Claims, 6 Drawing Sheets

(56) References Cited

U.S. PATENT DOCUMENTS

| | | | |
|---|---|---|---|
| 2005/0086682 A1* | 4/2005 | Burges | H04H 20/16 |
| | | | 725/19 |
| 2006/0271947 A1 | 11/2006 | Lienhart et al. | |
| 2015/0163545 A1* | 6/2015 | Freed | H04N 21/44008 |
| | | | 725/19 |
| 2015/0255066 A1* | 9/2015 | Wilder | G06K 9/00744 |
| | | | 704/235 |
| 2017/0316455 A1* | 11/2017 | Fichter | G06Q 30/0246 |

* cited by examiner

SYSTEM TO BUILD ADVERTISEMENT DATABASE FROM UNRELIABLE SOURCES

TECHNICAL FIELD

The present disclosure relates to the field of multimedia identification and recognition, and more particularly, to systems and methods to build an advertisement database from unreliable sources, such as television programming.

BACKGROUND

Generally, audiovisual multimedia content such as television programming or video streaming includes embedded advertisements. Determining the location of advertisements in the multimedia content may be desirable, for example, to enable removal or replacement of advertisements. Markers (sometimes referred to as "bumpers") may be used to denote the beginning and ending of advertisements in certain multimedia content. However, often such markers are not used. Because the location and length of advertisements is often variable, excessive human involvement may be required to identify the location of advertisements.

SUMMARY

The present disclosure describes systems and methods for determining the location of advertisements in multimedia assets.

One example method includes obtaining a multimedia asset comprising at least one of video, audio and text, identifying segments of the multimedia asset, and for each segment, determining whether the respective segment represents an advertisement. For each segment that represents an advertisement, the method further includes extracting a predetermined number of fingerprints from the respective segment, submitting, to an advertisement database, the predetermined number of fingerprints, receiving, from the advertisement database, a count of the extracted fingerprints matching fingerprints previously stored in the advertisement database, and determining, based on the count, whether to add an indication that the respective segment is a new advertisement to the advertisement database.

One example system includes a receiver, a computer memory, and a processor. The receiver is connected to receive audio and video data from a multimedia stream. The computer memory contains an advertisement database. The processor is in communication with the receiver and the computer memory. The processor is programmed to obtain a multimedia asset, identify segments of the multimedia asset, and, for each segment, determine whether the respective segment represents an advertisement. For each segment that represents an advertisement, the processor is programmed to extract a predetermined number of fingerprints from the respective segment, submit, to the advertisement database, the predetermined number of fingerprints, receive, from the advertisement database, a count of the extracted fingerprints matching fingerprints previously stored in the advertisement database, and determine, based on the count, whether to add an indication that the respective segment is a new advertisement to the advertisement database. In addition to the above system, a non-transitory computer readable medium may contain computer instructions to cause a computer to perform the above steps.

BRIEF DESCRIPTION OF THE DRAWINGS

Further details of the example implementations are explained with the help of the attached drawings in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

The example systems and methods described below build an advertisement database from unreliable sources. Such advertisement database is utilized, for example, to detect the location of advertisements in multimedia assets such as television programs. These examples provide advantages over conventional systems in that they may require less human involvement, and in some cases little or no human involvement, to identify and catalog the advertisements. Further, these examples provide advantages over conventional systems in that they do not require the use of markers (such as frames corresponding to a bumper segment or audio tones or signals) to identify the location, or the beginning and/or ending, of advertisements in multimedia assets. These examples may offer enhanced precision in advertisement detection over conventional systems. By building an advertisement database from unreliable sources, the example systems and methods described herein may be used to determine the location of advertisements in multimedia assets and to enable automatic removal of advertisements or automatic replacement of advertisements during later viewing of stored multimedia assets.

Figure 1A:
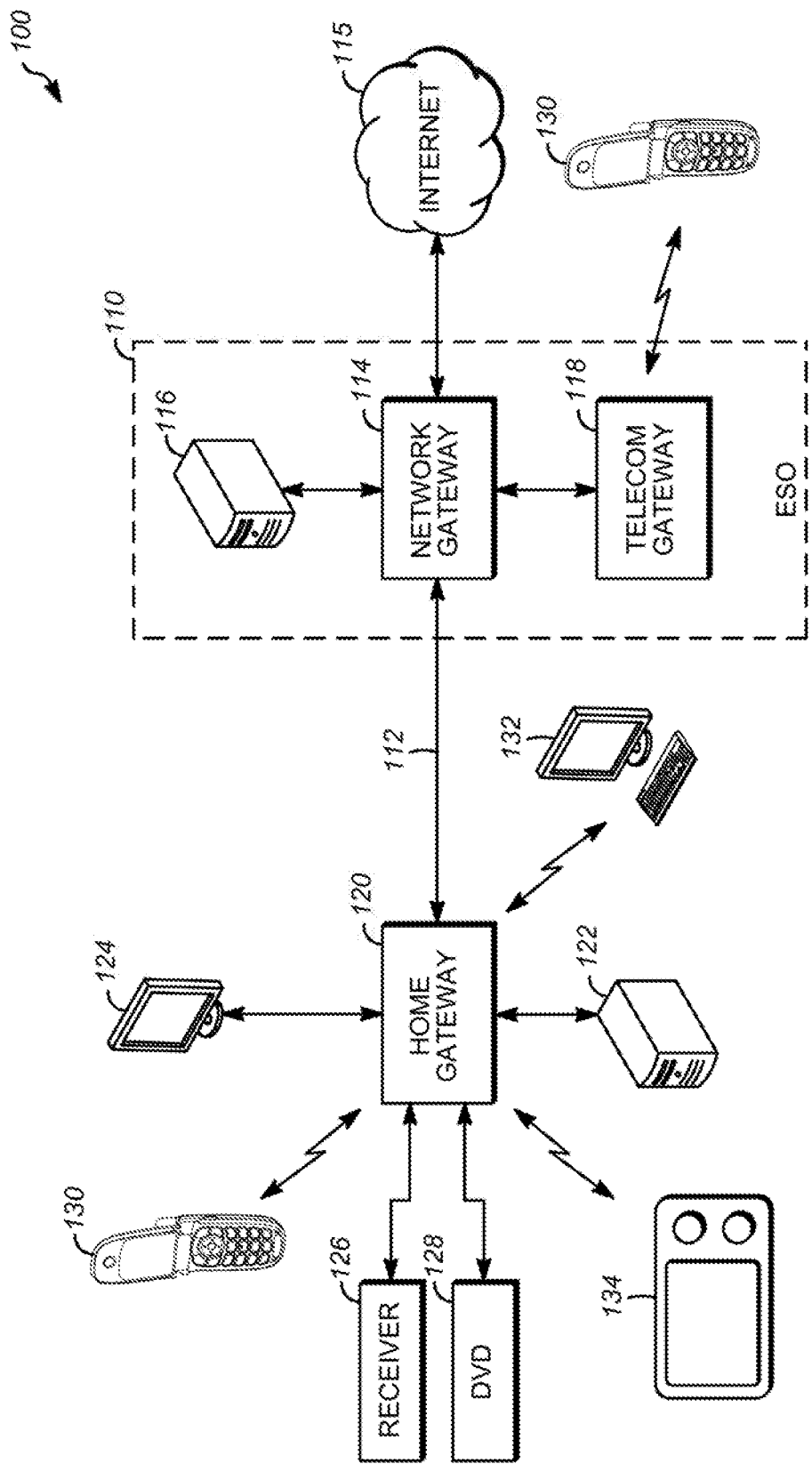
FIG. 1A depicts a block diagram of a system for detecting advertisements.

FIG. 1A depicts an embodiment of a system 100 for detecting advertisements. System 100 can be part of a communications network that can be used as a broadcast, ATSC, IPTV or IP Video delivery network that transports or delivers data files and multimedia content, including via multicast transmissions. The network environment can include an edge serving office (ESO) 110, which can be a head-end or central office of a multiple service provider (MSO) such as a cable, satellite, or telephone company. The ESO 110 can contain various communications equipment, such as one or more modulation/demodulation devices (not shown), a content server (not shown), and other communications equipment (not shown) that can provide video, data, and/or voice service to a user.

The communications equipment at the ESO 110 is operable to communicate with a home gateway 120 using a cable line network connection 112. In one example, the home gateway 120 includes the functionality of a set-top box (STB). The combination of the STB and the home gateway may be referred to as a set-top gateway. It is contemplated, however, that the STB may be separate from the home gateway. In this instance, the home gateway provides the network connection and the STB provides the media functionality. When the STB is separate from the home gateway 120, the STB may be connected to network connection 112 in parallel with the home gateway or may be connected to the home gateway 120 to receive IPTV packets from ESO 110 via the home gateway.

The communications equipment at the ESO 110 can be operable to communicate with one or more user devices through home gateway 120. The user devices may be customer premises equipment (CPE) devices such as a network attached storage (NAS) device 122, a digital television (DTV) receiver 124, a radio receiver 126, a digital video disc (DVD) player 128 including a streaming video facility, a mobile device 130, a computer 132 or a thermostat 134 or other Internet of things (IoT) device (e.g. an appliance, surveillance camera, light fixture, etc.) that connects to the Internet through the home gateway. These CPE devices can be located at or near a user's premises. In the example system, CPE device 130 is a mobile device that may have wireless telecommunications capability, even though it is designated as a "customer premise" device. In FIG. 1A, only particular CPE devices 122, 124, 126, 128, 130, 132, and 134 are shown for illustrative purposes, but more or fewer can be coupled to the ESO 110 via the home gateway 120.

Still referring to FIG. 1A, the communications equipment at the ESO 110 can communicate with one or more of the CPE devices 122, 124, 126, 128, 130, 132, and 134 through a transport network. Examples of ESO-to-Premises transport networks include one or more hybrid-fiber coaxial (HFC) networks and/or RF over Glass (RFoG) networks. An example HFC network can use a combination of optical fibers and coaxial cable as the network connection 112 to send data to and receive data from the communications equipment at the ESO 110. One or more RFoG networks can be deployed with existing HFC networks. RFoG networks typically include an all-fiber service from the ESO 110 to a field node, or home gateway 120, which is typically located at or near the user's premises. Coaxial cable can be used to connect the optical network units (ONUs) of an RFoG network to one or more user devices 122, 124, 126, 128, 130, 132, and 134. Additionally, any other wired or wireless networks can be used, including Passive Optical Networks (PON), Gigabit Passive Optical Networks (GPON), Digital Subscriber Line (DSL), Wi-MAX, or Ethernet.

In this example, the NAS device 122, DTV receiver 124, and radio receiver 126 may be coupled to the home gateway 120 via physical connections. The mobile device 130 may be coupled to the gateway 120 via a short-range radio frequency (RF), magnetic or optical connection (e.g. 802.11 WiFi, Bluetooth, Zigbee Radio Frequency for Consumer Electronics (RF4CE), near field communication (NFC) or infra-red (IR)), and the computer 132, thermostat 134 and DVD player 128, may be coupled to the home gateway 120 via a wired connection such as a universal serial bus (USB) cable, a FireWire cable, an Ethernet connection and/or via a short-range RF, magnetic or optical wireless connection. Each of these connections may be considered to be a separate communications channel.

The ESO 110 includes an example network gateway 114 that provides access between a network and a data processing server 116 and, optionally provides access to other networks, such as the Internet. The gateway 114 may also provide access to a telecommunications gateway 118 that provides telecommunications access to CPE devices such as mobile device 130. The example mobile device 130 is also coupled to the home gateway 120 via the short-range RF, magnetic or optical connection. The ESO 110 may include data sources (not shown), that provide content to the CPE devices via a standard cable television connection or as an IPTV or IP Video delivery network. These data sources, for example, may be servers coupled to the network gateway 114 in the same manner as the data processing server 116.

Figure 1B:
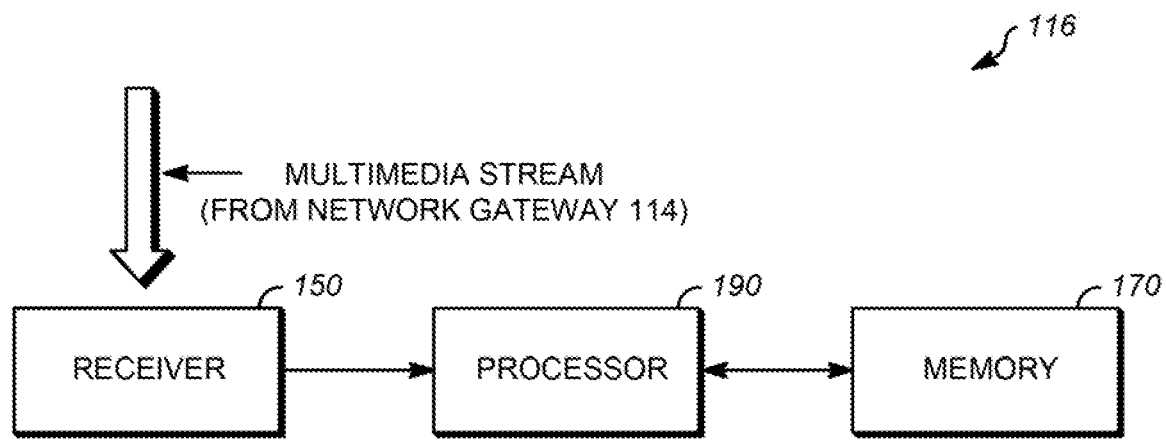
FIG. 1B depicts a block diagram of a data processing server of the system of FIG. 1A.

An example of a data processing server 116 is illustrated in FIG. 1B and described below. Generally, data processing server 116 includes a receiver 150, a computer memory 170, and a processor 190. Additional details of server 116 are set forth below.

Receiver 150 accepts the input of multimedia content for server 116. Receiver 150 is connected to receive the audio and video data in one or more multimedia streams from network gateway 114. As a multimedia asset is streamed (such as during a television broadcast), the audio and video portions of the asset may be acquired by receiver 150 for processing by server 116. Receiver 150 may further acquire certain additional data, such as programming data for the multimedia asset. The form of receiver 150 is not limited. Receiver 150 may have a physical connection which receives the multimedia stream(s) via communication by wire or optical fiber from network gateway 114. Alternatively, receiver 150 may be a wireless receiver which receives the multimedia stream(s) via wireless communication. Receiver 150 may include one or more tuners to enable receiving the multimedia streams from different broadcast channels, in order to receive multimedia content from multiple different programs.

Memory 170 stores data for use in detecting advertisements. In one example, memory 170 contains a database of audio signatures from the multimedia content of interest. As a multimedia asset is received by receiver 150, the audio portion of the asset may be subdivided into time periods of a predetermined length. Audio signatures can be generated for each time period of the multimedia asset either as the asset is streamed or some time thereafter. These audio signatures can be stored in the database in memory 170 for use in identifying advertisements in other multimedia assets, as described in greater detail below. The database may be large enough to be essentially unlimited in size and storage duration (e.g. a petabyte database), or may be a rolling database of audio signatures. In one example, audio signatures for every media asset (e.g., all television programs on all channels) are stored for a ten day period following their original streaming. Example processes for generating audio signatures are set forth in greater detail below. Suitable computer memories for use as memory 170 include, for example, one or more of Random Access Memory (RAM), EEPROM, magnetic media, optical media, etc.

Processor 190 is in communication with receiver 150 and memory 170. Processor 190 is programmed to determine whether a multimedia asset in the multimedia stream acquired by receiver 150 contains an advertisement. This determination is made using the audio data acquired by receiver 150 and the audio signatures stored in memory 170. Processor 190 is not limited to being a single processing component, but may comprise a combination of hardware and software modules programmed to perform the processes set forth below. Likewise, processor 190 need not refer to processing elements at a single location, but can refer to multiple separate processing elements connected by one or more network connections (such as in the distributed system described below).

In the example shown in FIGS. 1A and 1B, the hardware components associated with the detection of advertisements are provided at the head-end (cable company) of system 100, i.e., in ESO 110, and more particularly, in data processing server 116. However, it will be understood that the same components could be provided at the customer end, e.g. in home gateway 120 and/or in an STB. Moreover, the hardware components for detecting advertisements could be distributed between the head-end and the customer end. For example, certain processing functions, such as generation of audio signatures, could be performed at the home gateway 120 and/or STB, and other processing functions, such as storage and comparison of audio signatures, could be performed at ESO 110. In such an example, network connection 112 and network gateway 114 can facilitate communication of audio signatures and advertisement information between home gateway 120 and the ESO 110.

Figure 2:
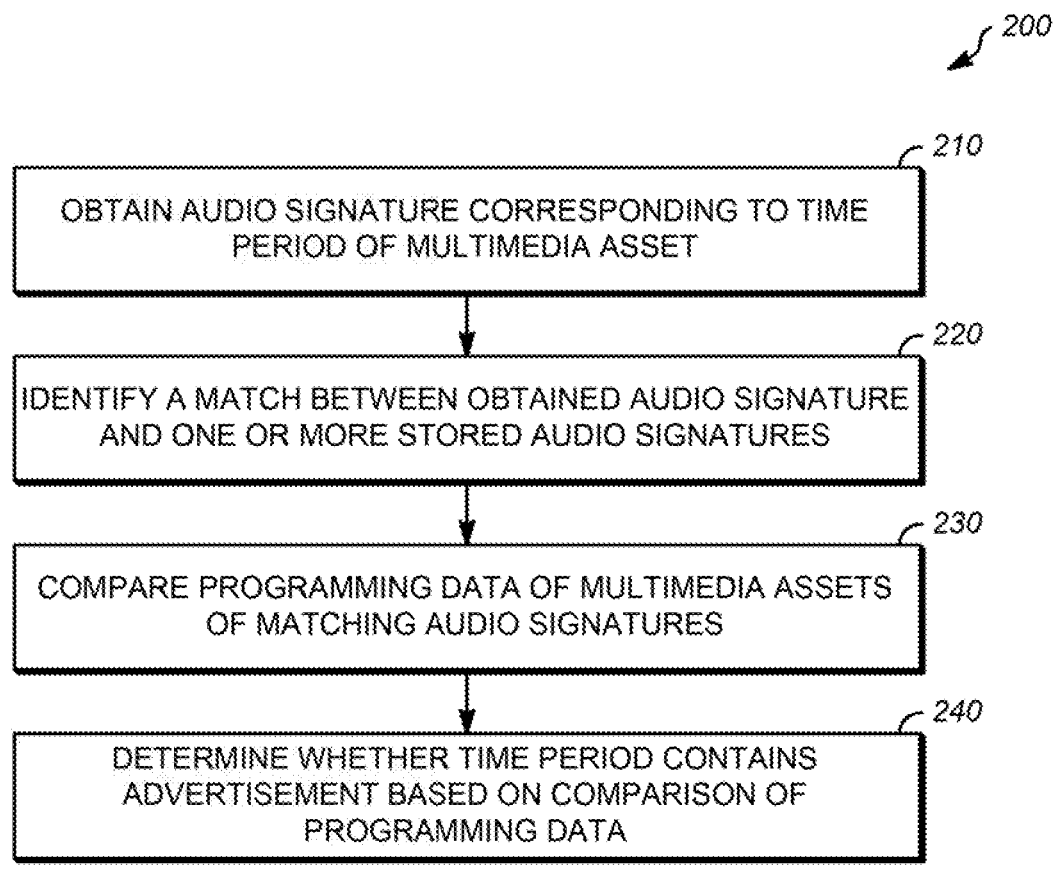
FIG. 2 depicts a flowchart including steps of a method for detecting advertisements.

FIG. 2 depicts a method 200 for detecting advertisements. Generally, method 200 includes obtaining an audio signature, identifying a matching audio signature, comparing programming data of the audio signatures, and determining the presence of an advertisement. Although the examples herein refer to audio signatures, this is only for simplicity. Alternatively, or in addition, signatures may be based on video, text (e.g., words superimposed on an image or contained within a banner) and/or some combination of video, audio and text. Additional details of method 200 are set forth below, and may be described with respect to the components of system 100.

In step 210, an audio signature is obtained. The audio signature corresponds to a time period of a multimedia asset of interest. The length of the time period may be predetermined. In one example, as a multimedia asset is received by receiver 150, the audio portion of the asset is subdivided into time periods of a predetermined length, such as ten second increments. It will be understood that other time periods may be used.

The audio signature may be a complete audio data file for the audio portion of the multimedia asset during the time period, or may be a processed or compressed version of the audio portion of the multimedia asset during the time period. In one example, processor 190 creates the audio signature by applying an audio fingerprinting function to an audio data file representing the audio of the multimedia asset during the time period. Suitable audio fingerprinting functions for use in generating the audio signature will be understood from the description herein, and include, for example, the Echoprint music identification system or other function that characterizes the audio segment by its frequency components. Compression may be used to form the audio signature in order to limit the size of the audio signature while maintaining sufficient characteristics of the underlying audio data to enable a unique or nearly unique identification of the audio signature. Accordingly, an example fingerprinting function may perform a frequency transform operation such as, without limitation, a fast Fourier transform (FFT), discrete cosine transform (DCT) or a Hadamard transform and then compress the result to obtain a descriptor for the sampled segment. A hash function may be applied to the descriptor to identify a location in a hash table corresponding to the descriptor. Alternatively, the descriptors may be stored in a binary tree based on characteristics of the descriptors or in another type of easily searchable database. The descriptor may be stored with electronic program guide (EPG) information identifying the multimedia asset and time frame from which the underlying audio segment was extracted.

In step 220, a match between audio signatures is identified. The match is identified by comparing the audio signature obtained in step 210 with a database of previously obtained audio signatures stored in memory 170. Creation and maintenance of such an advertisement database is described in greater detail below. When descriptors are hashed and stored into a hash table, other similar descriptors may be hashed to the same bin so that all descriptors in the bin may be treated as matching descriptors. The previously obtained audio signatures correspond to time periods of other multimedia assets, the time periods having the same lengths as the length of the time period of the audio signature obtained in step 210.

Figure 3:
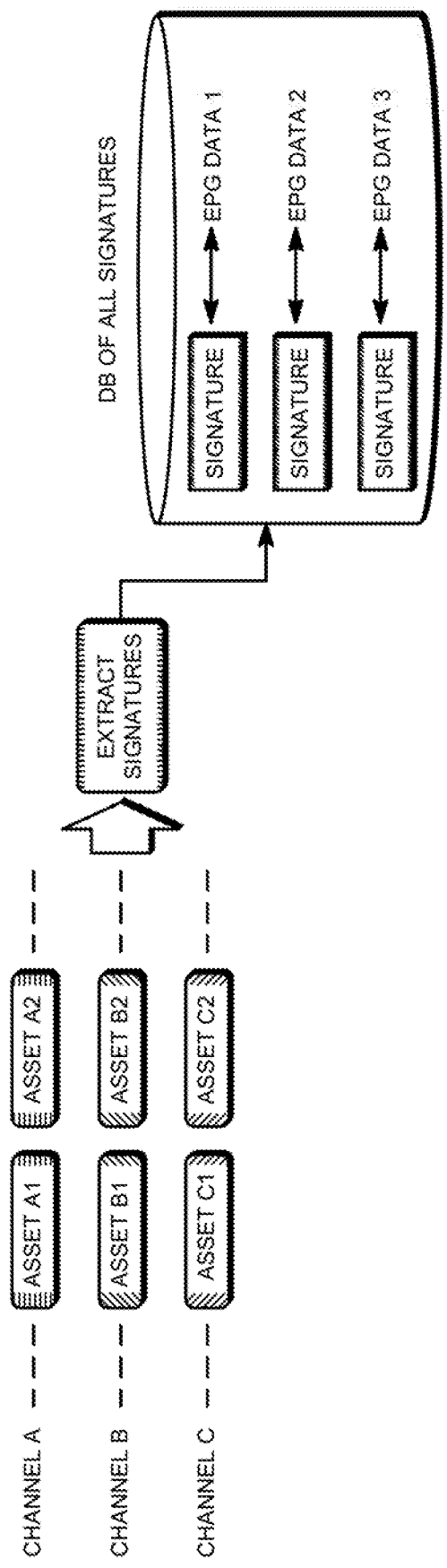
FIG. 3 depicts an example of a process for generating a database of audio signatures.

The database of audio signatures may contain audio signatures corresponding to all portions of a multimedia stream, including all multimedia assets received in a particular time interval, for example, the previous ten days. In one example shown in FIG. 3, the database contains audio signatures for all television programs (e.g. Assets A1, A2, B1, B2, C1, C2, etc.) drawn from all television channels (e.g. Channels A, B, C, etc.) over all hours of the day. Such a database may include audio signatures for portions of television programs and audio signatures for advertisements located within television programs. These signatures may be stored in the database in association with the EPG data, which is described in greater detail below.

The comparison of audio signatures may be performed in real time as a multimedia asset is streamed and/or as audio signatures are obtained, or the comparison may occur with any previously obtained audio signature stored in the database. The comparison may be performed between the obtained audio signature and each (other) stored audio signature in the database to identify all matches. A match may be identified in the audio signatures when the timing and frequency peaks of one audio signature are sufficiently similar or identical to the timing and frequency peaks of other audio signatures.

In step 230, programming data of the matching audio signatures may be compared. In one example, receiver 150 receives programming (EPG) data of the multimedia asset in addition to the audio and video data of the multimedia asset. In one implementation, this programming data is stored in memory 170 in connection with any audio signatures corresponding to the corresponding audio segment extracted from the multimedia asset. Processor 190 may then compare programming data of any matching audio signatures to identify differences.

Programming data may include metadata, or descriptive data, of the asset. Categories of information that may be included in the programming data received by receiver 150 include, for example, the genre of the asset, the title of the asset, the episode title for the asset, a description of the asset, a channel or service on which the asset is broadcast or streamed, and a time (including date) at which the asset is broadcast or streamed.

In step 240, it is determined whether the multimedia asset contains an advertisement. By comparing programming data of assets with programming data for matching audio signatures, differences in the programming data can be identified. In one example, processor 190 determines whether or not the time period to which the obtained audio signature belong likely corresponds to an advertisement based on the differences between the programming data of the obtained audio signature and any matching audio signatures.

For one example, it is understood that the same advertisement may be streamed in multiple different multimedia assets, such as the same commercial being shown during different television programs. Accordingly, when matching audio signatures occur in a number of multimedia assets having different titles, it may be determined that the obtained audio signature likely corresponds to a time period containing an advertisement.

For another example, it is understood that the same advertisement may be streamed on multiple different channels. Accordingly, when matching audio signatures occur in multimedia assets streamed on different channels, it may be determined that the obtained audio signature likely corresponds to a time period containing an advertisement. Such a determination may also be limited to assets having different titles or genres, to avoid confusion in situations where the same television program or segment is broadcast on different channels (such as during television news broadcasts or special events, for example).

Advertisements occurring in multimedia assets are generally limited in length, such as being limited to thirty or sixty seconds of time. In view of this limitation, multiple consecutive audio signatures from respective multimedia assets may be compared as a group to determine whether they contain an advertisement. For example, a plurality of audio signatures corresponding to consecutive time periods of a multimedia asset may be obtained in the manner set forth above. Matches may then be identified between the series of consecutive audio signatures and stored audio signatures. The determination of the presence of an advertisement may be made based on the length of time covered by the matching audio signatures. When the series of matching audio signatures is below a predetermined number, it may be determined that the consecutive time periods to which the matching audio signatures correspond contains an advertisement. Conversely, when the series of matching audio signatures is above a predetermined number, it may be determined that the consecutive time periods to which the matching audio signatures correspond do not contain an advertisement but may, instead, correspond to the same program being provided by multiple sources. The predetermined number of audio signatures may be selected based on the length of time covered by the audio signatures and the length of a typical advertisement. For example, for audio signatures corresponding to ten second increments, the predetermined number may be three, six, nine or twelve corresponding to the typical thirty, sixty, ninety or one-hundred twenty second lengths of advertisements.

While method 200 may be used to identify the location of an advertisement in a multimedia asset, this does not necessarily provide information regarding the location of the beginning or ending of the advertisement. Accordingly, it may be desirable to perform additional steps to identify the start and end of an advertisement. Examples of such identification are discussed below.

In addition to audio data, video data may be used to identify the start and end of advertisements. Accordingly, in addition to acquiring audio data of a multimedia asset, receiver 150 may further acquire video data of the multimedia asset. In one implementation, the video data includes a plurality of images (or frames). This video data may be processed and stored in a manner similar to audio data. The actual images that make up the video may be stored, or the images may be processed or compressed prior to storage. In one example, processor 190 processes the images to create a data file of the color-layout breakdown of each image, which is then stored. Such processing may be used in order to limit the size of the video data being stored while maintaining sufficient characteristics of the underlying video data to enable a unique or nearly unique identification of the video data. The processed images may be stored in a database in memory 170 (similar to the audio signatures), or may be stored in a separate memory. As with the audio signatures, the video data may be stored in association with programming data of the multimedia asset from which the video data was acquired.

In another implementation, the system may capture image segments representing blank frames. These blank frames are typically transmitted before and after each advertisement. The system may store a time index of the blank frames for each multimedia asset. This time index may then be correlated with the time data stored with the audio signatures to delimit the matching segments by two sets of blank frames. The sets of blank frames delimiting the advertisement are desirably limited to those separated by an amount of time corresponding to the length of an advertisement, however, as advertisements may include internal blank frames.

When it is determined that a time period of the multimedia asset contains an advertisement, video data for the time periods of the matching audio signatures may then be aligned with one another. In other words, a series of processed images (or frames) of the video data for the time period of the obtained audio signature is placed in a sequence alongside a series of processed images (or frames) of the video data for the time periods of any matching audio signatures.

After the video data is aligned, one need only work backwards to identify the beginning of the advertisement. For example, the video data for time periods preceding the matched audio signatures is compared with one another. Once the beginning of the advertisement is reached, the video and/or audio data begins to differ, due to the differences in the multimedia assets in which the advertisement is located. Thus, the beginning of the advertisement may be identified when the video and/or audio data in the time period preceding one of the matching audio signatures becomes sufficiently different from (i.e. has different hashing bins or exhibits low correlation) the video and/or audio data in the time period preceding another one of the matching audio signatures. The end of the advertisement may be identified using substantially the same process. It may be desirable to compare uncompressed image data from two multimedia assets as the same frame may be compressed differently in two data streams.

As can be seen in the above discussion, creation and maintenance of an advertisement database that includes accurate signatures of advertisements is important. However, creation and maintenance of such an advertisement database can require significant human interaction. In order to avoid human interaction, systems and methods that build an advertisement database from unreliable sources are needed. The following examples depict such systems and methods that automatically build an advertisement database based on estimations made by an advertisement detection system.

Figure 4A:
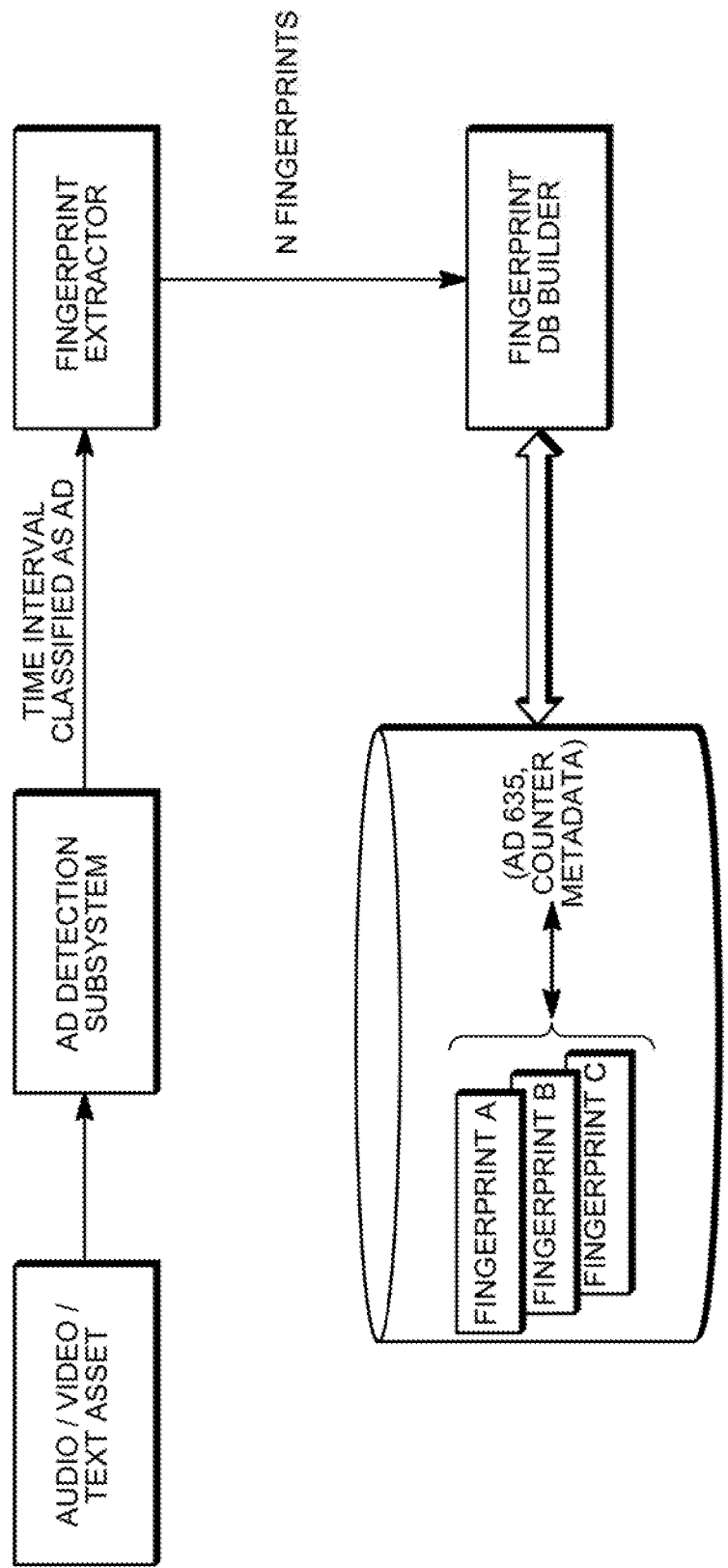
FIGS. 4A and 4B depict an example of a process for determining whether a portion of a multimedia asset contains an advertisement.
Figure 4B:
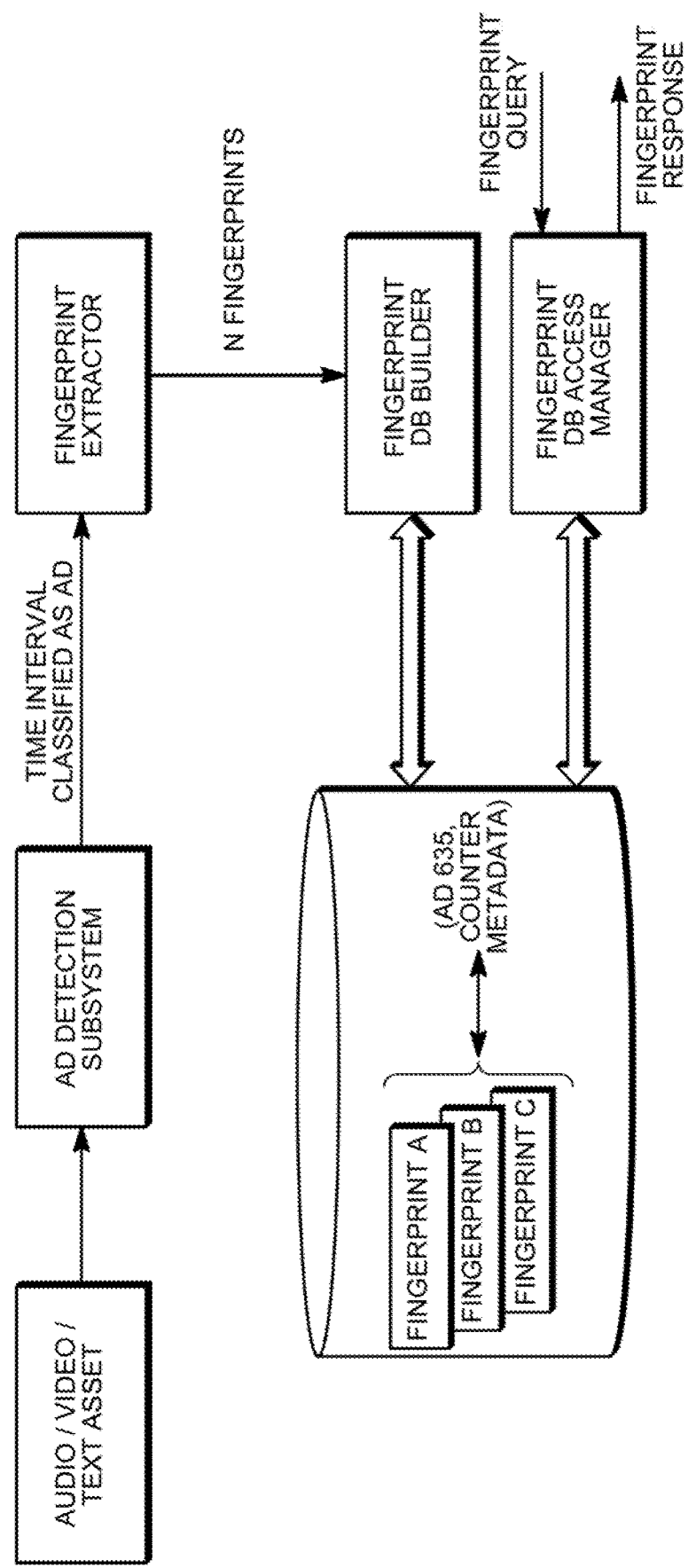
Figure 5:
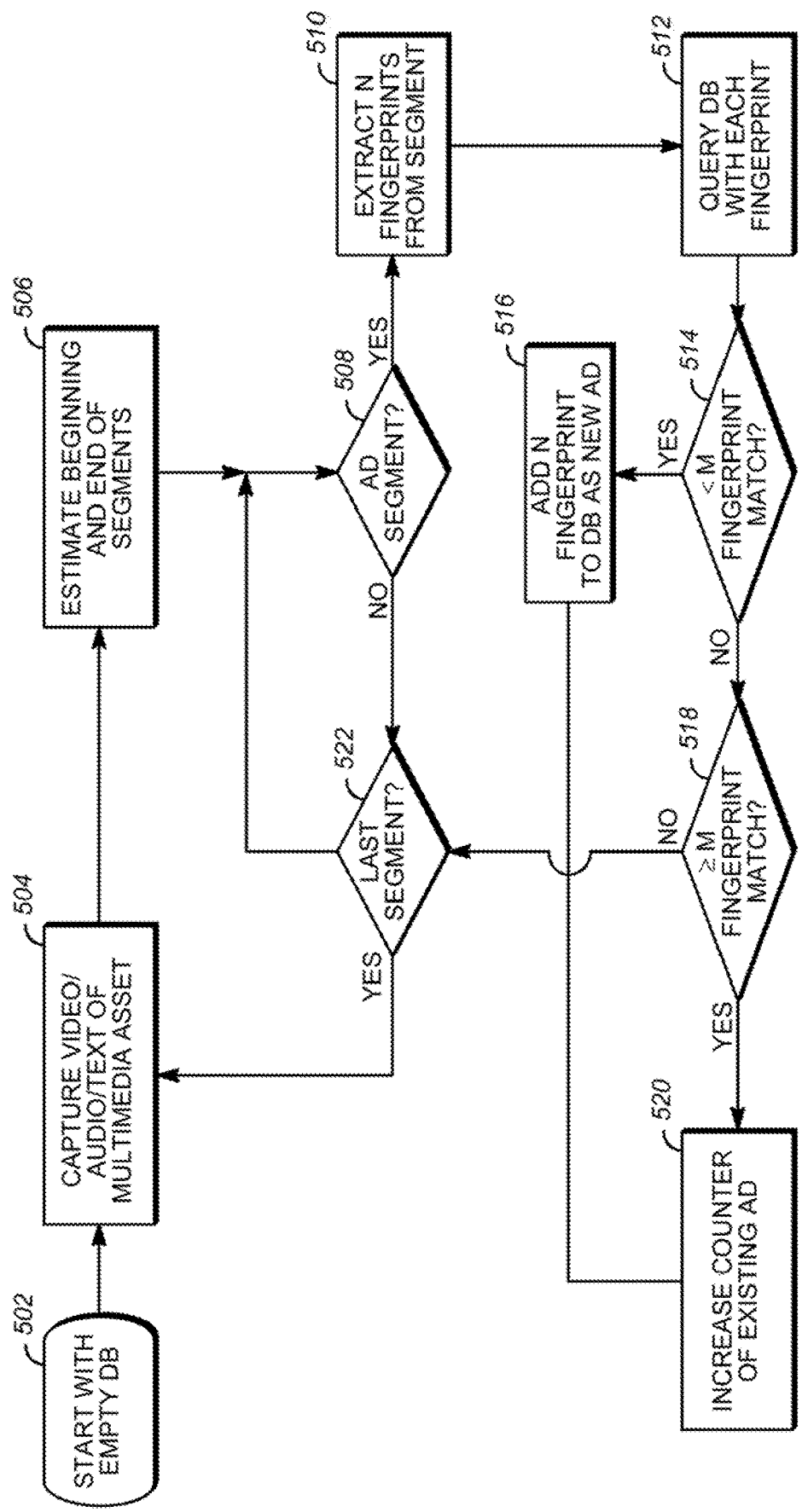
FIG. 5 depicts an example of a process for identifying the beginning of an advertisement in a multimedia asset.

In one example depicted in FIG. 4A, an advertisement detection subsystem extracts fingerprints from multimedia assets. The fingerprints are based on estimates determined by the advertisement detection subsystem. These fingerprints of estimated advertisements are utilized to build an advertisement database. In a further example depicted in FIG. 4B, the advertisement database is utilized to identify subsequent occurrences of ads within subsequent multimedia assets. Although not explicitly depicted, the advertisement database of FIG. 4B may also be used in conjunction with an advertisement replacement system. In such a system, a subsequent occurrence of an advertisement may be replaced with an alternate advertisement and/or other multimedia content. FIG. 5 depicts an example of a process flow of a method for building an advertisement database, such as depicted in FIGS. 4A-4B.

In the example of FIG. 5, the process starts at step 502 with an empty database. In step 504, the system captures video, audio and/or text of a multimedia asset, such as television programming. In step 506, an advertisement detection subsystem estimates a beginning and an ending for each segment within the multimedia asset. Such estimates may be performed as described herein above. In step 508, a segment is evaluated to determine whether the segment is an advertisement segment (e.g., the segment contains or is a portion of an advertisement). If so, the process continues to step 510. Otherwise, the process continues to step 522 where the system determines whether the current segment is the last segment of the captured multimedia asset. If not, the next segment is selected and the process returns to step 508. Otherwise, the process moves to step 504 where another multimedia asset is captured.

In step 510, N fingerprints are extracted from the advertisement segment. As discussed above, a fingerprint is a portion of the advertisement segment. The N fingerprints, in step 512, are each submitted to the database as a query. Although not depicted, the database compares the N fingerprints to any fingerprints previously stored in the database to determine whether any of the N fingerprints matches any of the previously stored fingerprints. The database then responds by providing an indication of whether each of the N fingerprints matches a previously stored fingerprint. The process, in step 514, evaluates the response and if less than M fingerprints match previously stored fingerprints, then the process continues to step 516. In one example, M is a number less than N and represents a threshold (e.g., 80%). In this example, if N is 30 and M is 24 (i.e., 80%), then the process would move to step 516 if less than 24 of the 30 fingerprints matched previously stored fingerprints. Otherwise, the process moves to step 518.

In step 516, the N fingerprints are added to the database and identified as a new advertisement. For example, each of the N fingerprints is stored in the database. Further in this example, an ad record is created in the database and each of the N fingerprints is associated with or otherwise linked to the ad record. The ad record includes, for example, a unique identifier, an integer counter and metadata. The process then continues to step 522. The system, in step 522, determines whether the current segment is the last segment of the captured multimedia asset. If not, the next segment is selected and the process returns to step 508. Otherwise, the process moves to step 504 where another multimedia asset is captured.

Returning to step 518, the system determines whether M or more fingerprints matched previously stored fingerprints. For example, given 30 fingerprints and M=24, a match occurs if 24 or more of the 30 fingerprints match previously stored fingerprints. In a further example, each of the previously stored fingerprints are associated with or otherwise linked to the same ad record. That is, an ad record with the most matching previously stored fingerprints that exceeds the M threshold is identified as the matching ad. Matching M or more fingerprints is an indication that the advertisement segment matches an advertisement previously stored in the database. As such, in step 520, a counter associated with the previously stored advertisement is increased. The process then proceeds to step 522.

In the process described above, an advertisement segment is identified as an existing advertisement when the number of matching fingerprints exceeds a threshold. Alternatively, or in addition, such identification may also require that metadata associated with the advertisement segment is sufficiently different from metadata stored in the database (e.g., different genres, different title, different channel). For example, as part of step 516, in addition to storing the N fingerprints, metadata related to the advertisement segment is also stored in the database and associated with or otherwise linked to the ad record. The metadata includes, for example, electronic program guide (EPG) information and the time within the multimedia asset at which the fingerprints occurred (e.g., a time in seconds measured from the beginning of the multimedia asset). The EPG information includes, for example, the title, episode title, description, genre, episode number, channel or station, and/or data and time of airing. Furthermore, as part of step 518, a determination of whether metadata associated with the advertisement segment is different from previously stored metadata is also made. Then, in step 520, in addition to increasing the counter, the metadata associated with the advertisement segment is added to the database and associated with the ad record as additional metadata.

In another variation, fingerprints may be stored in conjunction with a sequence in which the fingerprints occur. Then, in addition to matching M or more previously stored fingerprints, the sequence of occurrence also needs to match. By matching the sequence of occurrence, confidence can be increased that the segment represents an advertisement.

As can be seen, additional advertisement segments are added to the advertisement database over time. For each previously added segment that correctly identifies an advertisement, an associated counter is increased, thus validating the segment as an advertisement segment. However, for each previously added segment that does not correctly identify an ad, the associated counter remains constant. A threshold can be established, for example, that defines or otherwise indicates a confidence level of segments previously stored in the database. Over time, segments with an associated counter below the threshold can be removed from the database. In this way, errors can be minimized.

While the examples have been described above in connection with specific devices, apparatus, systems, and/or methods, it is to be clearly understood that this description is made only by way of example and not as limitation. Particular embodiments, for example, may be implemented in a non-transitory computer-readable storage medium for use by or in connection with an instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the claims. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method comprising:
providing an advertisement database having storage that is initially empty of advertisement fingerprints;
obtaining a multimedia asset, the multimedia asset comprising at least one of video, audio and text;
identifying segments of the multimedia asset, each of the segments corresponding to a time period; and
for each of the segments:
determining whether the respective segment contains at least a portion of an advertisement by:
extracting a predetermined number of fingerprints from the respective segment,
submitting, to the advertisement database, the predetermined number of fingerprints, and
receiving, from the advertisement database, a count of the extracted fingerprints matching fingerprints previously stored in the advertisement database; and
upon determining, based at least on the count, that the respective segment contains at least a portion of an advertisement:
aligning a first series of frames of video data from the multimedia asset with a second series of frames of video data from the advertisement database to identify a beginning of the advertisement within the respective segment, and to identify an end of the advertisement within the respective segment; and
determining, based at least on the count, whether to add to the advertisement database an indication that a time period of the respective segment from the identified beginning of the advertisement to the identified end of the advertisement is a new advertisement.

2. The method of claim 1, wherein the step of identifying segments comprises:
submitting, to the advertisement database, the obtained multimedia asset; and
receiving, from the advertisement database, each segment of the multimedia asset, each segment being based on an estimated beginning for the respective segment and an estimated ending for the respective segment.

3. The method of claim 1, wherein:
determining whether the respective segment contains at least a portion of an advertisement comprises:
submitting, to the advertisement database, some number of fingerprints extracted from the respective segment, and
receiving, from the advertisement database, an indication of whether or not the respective segment is an advertisement; and
wherein the first series of frames of video data from the multimedia asset is a series of video frames associated with an extracted fingerprint, and
wherein the second series of frames of video data from the advertisement database is a series of video frames associated with a corresponding matching fingerprint.

4. The method of claim 1, wherein:
determining whether to add the indication comprises determining whether the count is less than a threshold; and
upon determining the count is less than the threshold:
adding, to the advertisement database, the predetermined number of fingerprints extracted from the respective segment as the indication that the respective segment is a new advertisement; and
setting a counter associated with the indication to one.

5. The method of claim 1, further comprising:
determining whether to add the indication comprises determining whether the count is less than a threshold; and
upon determining the count is not less than the threshold, incrementing, by the advertisement database, a counter associated with the previously stored fingerprints that matched the count of extracted fingerprints.

6. The method of claim 1, further comprising:
for each indication of an advertisement in the advertisement database:
determining whether a counter associated with the respective indication is greater than a threshold; and
upon determining the associated counter is not greater than the threshold, removing the respective indication from the advertisement database.

7. The method of claim 6, wherein the removing comprises deleting any fingerprint corresponding to the respective indication from the advertisement database.

8. The method of claim 1, further comprising:
receiving a fingerprint query, the fingerprint query comprising a number of fingerprints extracted from a multimedia asset segment;
submitting, to the advertisement database, the number of fingerprints;
receiving, from the advertisement database, an indication of whether the number of fingerprints matches previously stored fingerprints; and
upon receipt of an indication that the number of fingerprints matches previously stored fingerprints, replacing the multimedia asset segment with another multimedia asset segment.

9. A system, comprising:
a receiver connected to receive audio and video data from a multimedia stream;
a computer memory containing an advertisement database having storage that is initially empty of advertisement fingerprints; and
a processor in communication with the receiver and the computer memory, the processor programmed to:
obtain a multimedia asset, the multimedia asset comprising at least one of video, audio and text;
identify segments of the multimedia asset, each of the segments corresponding to a time period; and
for each of the segments:
determine whether the respective segment contains at least a portion of an advertisement by:

extracting a predetermined number of fingerprints from the respective segment, submitting, to the advertisement database, the predetermined number of fingerprints, and receiving, from the advertisement database, a count of the extracted fingerprints matching fingerprints previously stored in the advertisement database; and upon a determination, based at least on the count, that the respective segment contains at least a portion of an advertisement:

align a first series of frames of video data from the multimedia asset with a second series of frames of video data from the advertisement database to identify a beginning of the advertisement within the respective segment, and to identify an end of the advertisement within the respective segment; and determine, based at least on the count, whether to add to the advertisement database an indication that a time period of the respective segment from the identified beginning of the advertisement to the identified end of the advertisement is a new advertisement.

10. The system of claim 9, wherein the processor is further programmed to:

submit, to the advertisement database, the obtained multimedia asset; and receive, from the advertisement database, each segment of the multimedia asset, each segment being based on an estimated beginning for the respective segment and an estimated ending for the respective segment.

11. The system of claim 9, wherein the processor is further programmed to:

determine whether the count is less than a threshold by counting the number of fingerprints that both match fingerprints previously stored in the advertisement database and also are associated with a single advertisement record identifier; and upon a determination that the count is less than a threshold:

add, to the advertisement database, the predetermined number of fingerprints extracted from the respective segment as the indication that the respective segment is a new advertisement;

store, in the advertisement database, metadata related to the multimedia asset; and set a counter associated with the indication to one.

12. The system of claim 9, wherein the processor is further programmed to:

upon a determination that the count is not less than a threshold, increment a counter associated with the previously stored fingerprints that matched the count of extracted fingerprints.

13. The system of claim 9, wherein the processor is further programmed to:

for each indication of an advertisement in the advertisement database:

determine whether a counter associated with the respective indication is greater than a threshold; and upon a determination that the associated counter is not greater than the threshold, remove the respective indication from the advertisement database.

14. The system of claim 13, wherein the processor is further programmed to remove the respective indication from the advertisement database by deleting any fingerprint corresponding to the respective indication from the advertisement database.

15. A non-transitory computer readable medium containing computer instructions, the instructions causing a computer to:

provide an advertisement database having storage that is initially empty of advertisement fingerprints;

obtain a multimedia asset, the multimedia asset comprising at least one of video, audio and text;

identify segments of the multimedia asset, each of the segments corresponding to a time period; and for each of the segments:

determine whether the respective segment contains at least a portion of an advertisement by:

extracting a predetermined number of fingerprints from the respective segment, submitting, to the advertisement database, the predetermined number of fingerprints, and receiving, from the advertisement database, a count of the extracted fingerprints matching fingerprints previously stored in the advertisement database; and upon a determination, based at least on the count, that the respective segment contains at least a portion of an advertisement:

align a first series of frames of video data from the multimedia asset with a second series of frames of video data from the advertisement database to identify a beginning of the advertisement within the respective segment, and to identify an end of the advertisement within the respective segment; and determine, based at least on the count, whether to add to the advertisement database an indication that a time period of the respective segment from the identified beginning of the advertisement to the identified end of the advertisement is a new advertisement.

16. The computer readable medium of claim 15, wherein the instructions further cause the computer to:

submit, to the advertisement database, the obtained multimedia asset; and receive, from the advertisement database, each segment of the multimedia asset, each segment being based on an estimated beginning for the respective segment and an estimated ending for the respective segment.

17. The computer readable medium of claim 15, wherein the instructions further cause the computer to:

determine whether the count is less than a threshold by counting the number of fingerprints that both match fingerprints previously stored in the advertisement database and also are associated with a single advertisement record identifier; and upon a determination that the count is less than a threshold:

add, to the advertisement database, the predetermined number of fingerprints extracted from the respective segment as the indication that the respective segment is a new advertisement;

store, in the advertisement database, metadata related to the multimedia asset; and set a counter associated with the indication to one.

18. The computer readable medium of claim 15, wherein the instructions further cause the computer to:

upon a determination that the count is not less than a threshold, increment a counter associated with the previously stored fingerprints that matched the count of extracted fingerprints.

19. The computer readable medium of claim 15, wherein the instructions further cause the computer to:
for each indication of an advertisement in the advertisement database:
determine whether a counter associated with the respective indication is greater than a threshold; and
upon a determination that the associated counter is not greater than the threshold, remove the respective indication from the advertisement database.

20. The computer readable medium of claim 19, wherein the instructions further cause the computer to remove the respective indication from the advertisement database by deleting any fingerprint corresponding to the respective indication from the advertisement database.

\* \* \* \* \*